United States Patent [19]

Hodge

[11] Patent Number: 4,956,852
[45] Date of Patent: Sep. 11, 1990

[54] METHOD FOR REMOTE CONFIGURATION OF A MODEM

[75] Inventor: Dean Y. Hodge, Madison, Ala.

[73] Assignee: Universal Data Systems, Inc., Huntsville, Ala.

[21] Appl. No.: 238,800

[22] Filed: Aug. 30, 1988

[51] Int. Cl.$^5$ .............................................. H04Q 9/00
[52] U.S. Cl. .................... 375/8; 340/825.07; 375/121
[58] Field of Search ................ 375/7, 8, 121; 379/93, 379/96, 97, 98, 108, 109; 370/24; 455/73, 88; 340/825.14, 825.07, 825.52

[56] References Cited

U.S. PATENT DOCUMENTS 4,646,320  2/1987  Krishnan ................................. 375/8
4,751,510  6/1988  de Saint Michel et al. ... 340/825.07
4,782,498 11/1988  Copeland ............................ 375/121

Primary Examiner—Benedict V. Safourek
Attorney, Agent, or Firm—Charles L. Warren

[57] ABSTRACT

A method for remotely configuring a modem in a communication system is described herein. Specifically, the method allows a modem user the ability to modify or view the options of a remote modem by placing the remote modem first into a test mode. The method, following the execution of the test mode, provides some security through the use of a security code which is programmable by the remote user. The remote modem is then placed into a reconfiguration mode, after which the local modem transmit commands to the remote modem using a bi-sync protocol to ensure accurate reception of commands and responses. The process of remote configuration is terminated by exiting the reconfiguration and test modes.

14 Claims, 5 Drawing Sheets

METHOD FOR REMOTE CONFIGURATION OF A MODEM

BACKGROUND ART

The present invention generally relates to modems and in particular to an improved method of remotely configuring a modem.

Generally, in a communication system using at least two modems, remote configuration of a modem has been accomplished through the use of a signal that is composed of a main channel and a tertiary channel. The tertiary channel resides at a lower frequency of the overall signal and contains remote commands to reconfigure the modem to a particular desired state. Typically, such would be accomplished over two or four wireline communications and would be usable in the full or half duplex mode of operation.

This method, however, of remotely configuring a modem has its drawbacks. For instance, such use of a tertiary channel occupies signal channel thereby reducing bandwidth. Further, the tertiary channel is a small channel which lies at the low end of the signal thereby bringing about reliability problems and an overall less robust signal.

SUMMARY OF THE INVENTION

It is the object of this invention to provide an improved method for remotely configuring modems in a communication system.

It is also an object of this invention to provide an improved modem that is capable of remotely configuring another modem in a full or half duplex operation without the need for a tertiary channel.

It is a further object of this invention to provide for an improved modem which is capable of being remotely configured through signals received from a single main channel.

In summary, the present invention involves a method which allows a modem user the ability to modify or view the options of a remote modem by placing the remote modem first into a test mode. The test mode mentioned in this method is the remote digital loop (RDL) which is a standard used in the industry for full duplex modems, a similar test being usable for half duplex modems. The method, following the execution of the test mode, provides some security through the use of a security code which is programmable by the remote user. The remote modem is then placed into the reconfiguration mode, after which the local modem transmits commands to the remote modem using a bi-sync protocol to ensure accurate reception of commands and responses. The process of remote configuration is terminated by exiting the test mode.

DETAILED DESCRIPTION OF THE PREFERRED EMBODIMENT

For a better understanding of the present invention together with other and further advantages and capabilities thereof, reference is made to the following disclosure and appended claims in connection with the above described drawings.

Figure 6:
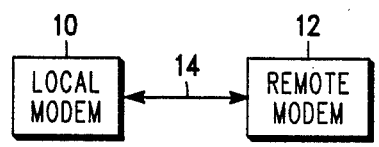
FIG. 6 illustrates a local and remote modem according to the present invention.

FIG. 6 illustrates a local modem 10 coupled to a remote modem 12 by a communication channel 14 such as the public switched telephone network. In accord with the present invention, a user can reconfigure remote modem 12 by signals transmitted over main channel 14 by local modem 10. The method for implementing this reconfiguration is described below.

Figure 1A:
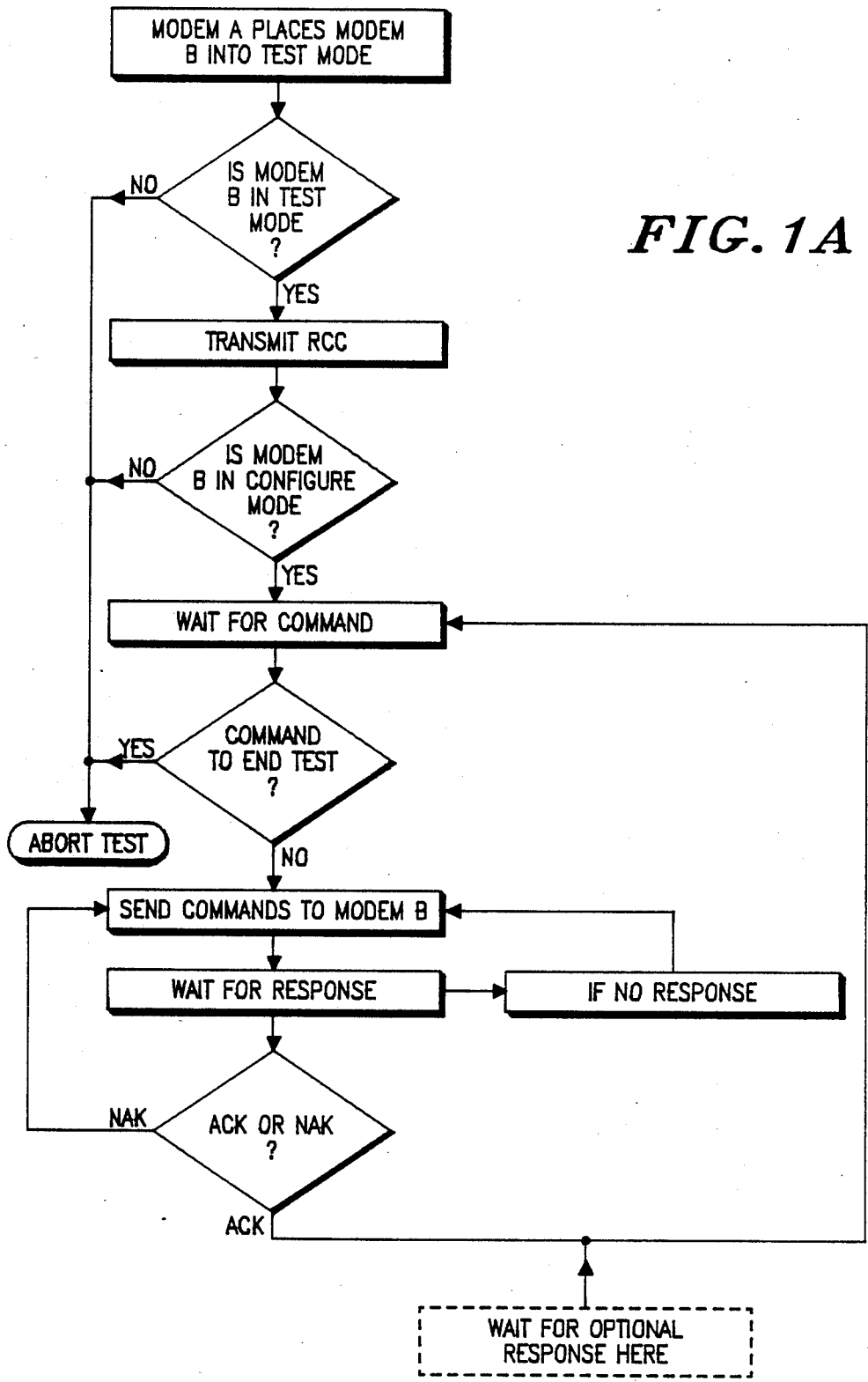
FIGS. 1a and b illustrate flow chart diagrams of the local and remote modem as they progress through their remote configuration scheme.
Figure 1B:
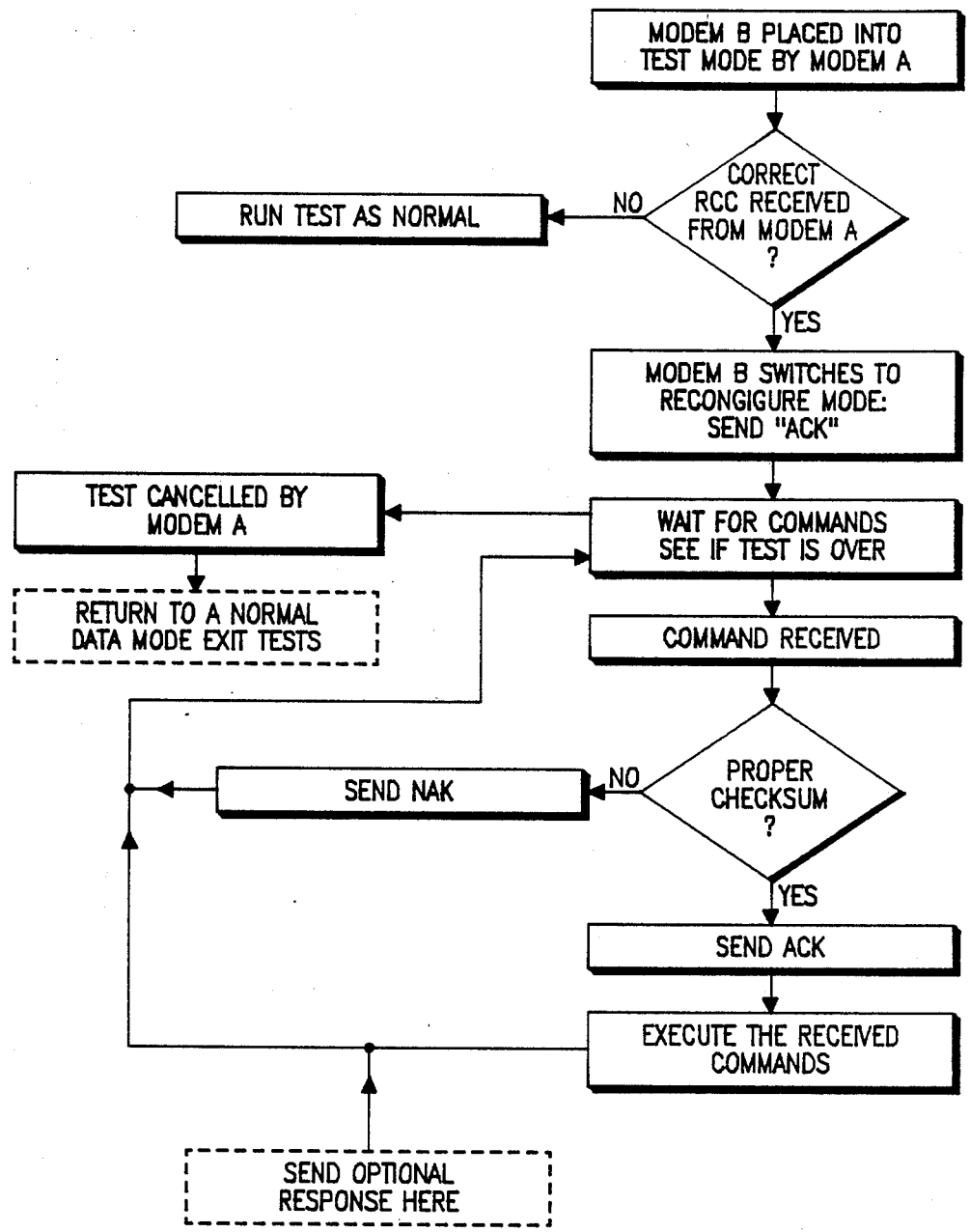

Referring now to FIGS. 1a and 1b, there is illustrated flow charts of the operation of the local and remote modems as they progress through the remote configuration schemes. In particular, in FIG. 1a modem A, which in this case is a local modem, places modem B (a remote modem) into a test mode via signals over a main channel, the test mode being the remote digital loop protocol (RDL). It is next determined whether modem B is in the test mode, meaning that the modem has been properly placed into the RDL condition. If modem B is in the test mode, modem A then proceeds to transmit a remote configuration code (RCC) over a main channel to modem B. If modem B has not been placed in the test mode then the test will be aborted. Once the RCC signal has been sent to modem B it is then determined if modem B is in the reconfiguration mode. If modem B is in the reconfiguration mode then it will be determined if modem A is ready to send reconfiguration commands to modem B. If modem B is not in its reconfigure mode then again the test will be aborted. If modem A is not ready to send its reconfigure commands to modem B then modem A will wait for such a command signal to be sent to it. Once the reconfiguration command signals are sent to modem B then modem A waits for a response to be received from modem B to either acknowledge receipt of the commands ("ACK") or to acknowledge that it has not received the commands correctly ("NAK"). In the instance where the "NAK" is received then modem A is again requested to send reconfiguration commands to modem B. Once modem A receives the "ACK" from modem B then modem A removes modem B from its reconfiguration mode. To completely terminate the reconfiguration process, modem A removes modem B from its test mode. The removal of modem B from reconfiguration mode and its test mode may also be accomplished in a single step.

Referring now to FIG. 1b, modem B is first placed into the test mode by modem A. Modem B then determines if a correct RCC signal has been received from modem A immediately after the test mode is established. If it has then modem B proceeds to switch into its reconfiguration mode and now waits for further commands. If the improper code is received from modem A then modem B remains in the test mode and will not accept another RCC until the test mode has been cancelled. Once modem B is in the reconfigure mode then modem B receives reconfigure commands from modem A. Once the command is received with the proper "CHECKSUM" (see FIG. 3) at the end of the command string sequence, modem B then sends an acknowledgment ("ACK") to modem A. If the command signals are not properly sent or a problem arises in the transmission of the command signals, modem B then sends modem A a "NAK" to advise that modem B did not receive the proper command signals. After the "ACK", the commands are then processed by modem B and any additional responses are sent to modem A. Once modem B has been properly reconfigured modem B then proceeds to receive a signal from modem A to move modem B out of its reconfigure mode. Modem B will then receive a subsequent signal from modem A to move modem B out of its test mode. Once again, modem B may be moved out of its reconfigure mode and test mode in a single step if desired.

Figure 2:
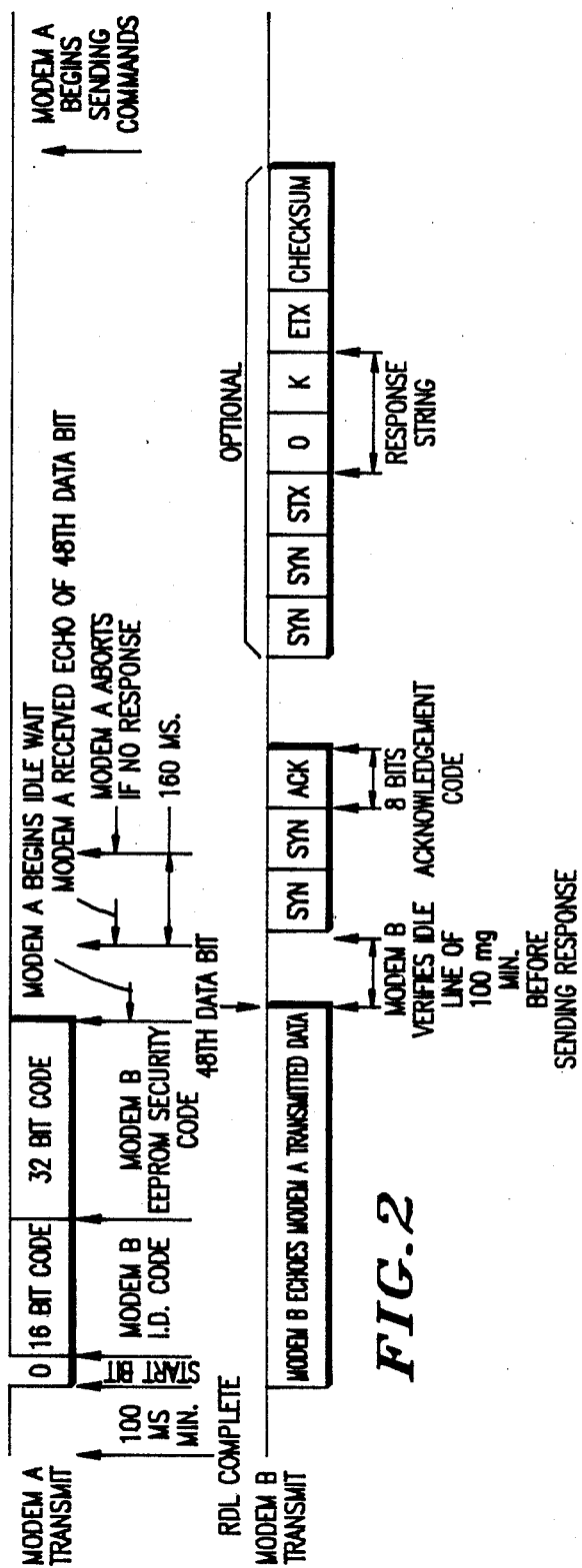
FIG. 2 illustrates the initialization sequence for remote configuration between the local and remote modem.

Referring now to FIG. 2, there is illustrated a more detailed example of the initialization sequence and the interaction that occurs between local modem A and remote modem B. In particular, modem A establishes a connection with modem B at a speed capable of execution of a test to monitor the received data line. This is normally accomplished over a single main channel. Modem A then places modem B into the test mode. Modem A can be the originate or answer modem depending on the system users. Modem A will now proceed to transmit to modem B a predetermined coded signal which is identifiable by modem B only which will cause modem B to change from its test mode to a reconfiguration mode. This is accomplished after modem A has completed the protocol and established the test mode and then holds the line for a minimum of 100 milleseconds. After this time has elapsed, modem A will transmit a start bit and a remote configuration code (RCC) to modem B. If modem B fails to identify the RCC signal it will stay in its test mode until modem B is removed from the test mode and the method is again repeated.

The RCC in this embodiment is a string of 48 data bits, with the first 16 bits defined as modem B's read only memory (ROM) based identification code, and the last 32 bits are user definable within modem B to allow for added security. After the 48 data bits are received by modem B, modem B verifies that the line is idle for at least 100 milleseconds. If the line doesn't remain idle modem B remains in the test mode and continues to echo bits sent from modem A. Otherwise, the first 16 data bits received are compared to the allowable ID code, then the last 32 bits are compared to data bits saved within the memory device of modem B. If any of the bits don't compare, then modem B will remain in the test mode. Once the data bits received are determined to be valid then modem B will respond to modem A with an acknowledgment code. Where an incorrect RCC signal is sent and the modems are in full duplex operation, no acknowledgment will be sent and modem B will just continue to echo data. The data bit comparison could also be performed while the bits are being received from modem A, yet, the 100 milleseconds delay must be verified before a response is sent. After the acknowledgment code is received by modem A, modem B is now in the reconfiguration mode and is ready to be remotely reconfigured. As illustrated in FIG. 2, modem A may send optional responses (such as printable text for a visible user) to modem B before modem B is reconfigured.

Figure 3:
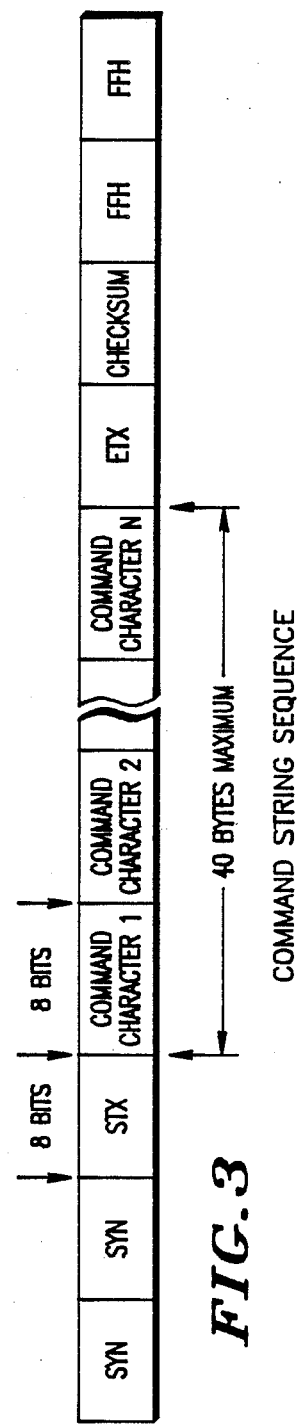
FIG. 3 illustrates an example of a command string sequence that is, transmitted from the local modem to the remote modem.

Following identification of the coded signal from modem A, modem B can now be configured through command string sequences that come from modem A. An example of a command string sequence is illustrated in FIG. 3 wherein a command string sent from modem A to modem B begins with an SYN SYN STX and ends with an ETX and CHECKSUM. A response from modem B normally is in the form of a SYN SYN ACK, however, multiple response strings, such as those illustrated in FIG. 4, may be sent back by modem B in order to advise modem A that an acceptable command string has been received from modem A. If an error is received in the command string then modem B responds with a SYN SYN NAK, as illustrated in FIG. 5, that will allow modem A to retransmit the command string. The process of remote configuration is terminated when modem A signals modem B to move out of the reconfigure mode back to the test mode and a subsequent signal to modem B that moves modem B out of the test mode and into its normal operation.

All command strings are normally initiated by modem A. The command string is limited to, in this example, 40 command characters not including the headers. Each command string usually begins with SYN SYN STX and end with an ETX and an 8 bit CHECKSUM other forms of CHECKSUM such as CRC-16 (bits) could be used. If modem B receives the proper command then it will respond with a acknowledgment and then modem B will begin processing the command string. If the command string is too long then modem B will respond to modem A with a NAK. In this example, modem B should respond to modem A within a time span equal to about four 8 bit characters, which is a typical delay for operation over telephone lines.

Figure 4:
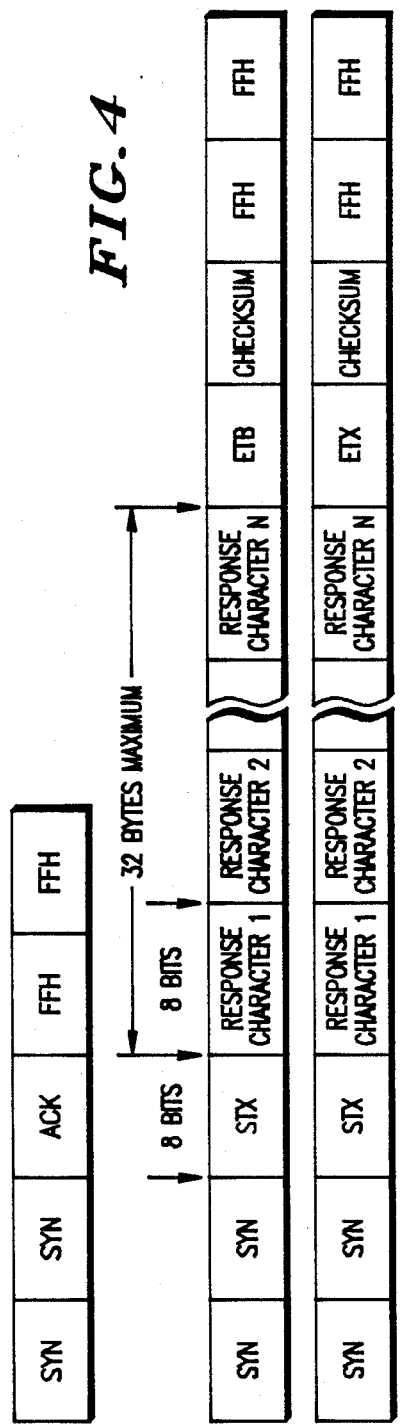
FIG. 4 illustrates a response string sequence for an acceptable command string.
Figure 5:
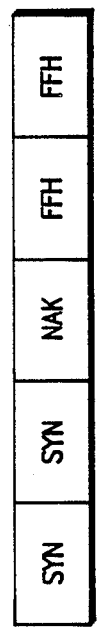
FIG. 5 illustrates a response for an unacceptable command string that is sent from the local modem to the remote modem.

Once modem B receives the command string and transmits the SYN SYN ACK, it will begin processing the command string received and then transmit any responses that are activated by the commands, (see FIG. 4). Using the particular sequence described herein our responses shall begin with a SYN SYN STX, as illustrated in FIG. 4. Since command strings can activate multiple responses in a remote unit, all response strings shall end with an ETB and a CHECKSUM; except the final response string which shall end with an ETX and CHECKSUM. This allows modem A to know when the command string has been completely processed. Once a response string is sent, modem B must wait for an acknowledgment from modem A before the next response can be sent. If modem B receives a SYN SYN ACK, it will continue processing the command string and send in the next response. If modem B receives a SYN SYN NAK, it will transmit the last response again. Where modem B gets an incorrect response, modem B shall not have a limit for how many times it will send a response string in response to modem A's request with a SYN SYN NAK. Modem A shall retain this control by either ignoring the responses or sending acknowledgments to allow modem B to continue sending responses. Yet, if modem B receives no response after a span of ten 8-bit characters (telephone line delay), modem B will abort and re-transmit the response. If modem B receives neither a NAK or ACK after a predetermined period it will abort the responses and wait for another command.

The benefits of using the method described herein include the remote reconfiguration of a plurality of modems that may be arranged in a rack and communicate with the local main modem through a communications bus. Through the use of the remote configuration code, certain modems could be reconfigured without affecting other modems in the rack structure. In addition, if mass reconfiguration was necessary such could be done at times of low density traffic without the need for personnel at remote sites to reconfigure the modems. In addition, this method is capable of identifying if there is an incompatible modem that the local modem is attempting to reconfigure. This method will operate for either two or four wire line communications and can operate for full or half duplex mode of operations.

While there have been shown and described what are at present considered to be preferred embodiments of the invention, it will be obvious to those skilled in the art that various changes and modifications may be made therein without departing from the scope of the invention as defined by the appended claims.

What is claimed is:

1. In a communications system having at least a first and a second modem, a method selectively operable by a user for remotely configuring a modem without using a tertiary channel, said method comprising the steps of:
   using said first modem to place said second modem in a test mode via a main channel;
   transmitting from said first modem via said main channel, following said test mode placement step, a predetermined coded signal identifiable by said second modem primarily causing said second modem to change from said test mode to a reconfiguration mode;
   configuring said second modem following identification of said coded signal via at least one signal from said first modem; and
   using said first modem to move said second modem out of said reconfigure mode.

2. The method according to claim 1 wherein said method further includes the step of:
   receiving an acknowledgment from said second modem that said coded signal has been identified and that said second modem is in said reconfiguration mode after said transmitting step.

3. The method according to claim 1 wherein said method further includes the steps of:
   removing said second modem from test mode after said step of transmitting said coded signal when said coded signal is not identified by said second modem.

4. The method according to claim 1 further comprising the step of said first modem configuring said second modem only upon receipt of a predetermined acknowledge signal from said second modem in response to said second modem receiving a predetermined remote configuration code (RCC) from said first modem.

5. A modem for remotely configuring another modem in a communication system utilizing a main channel, said modem comprising:
   means selectable by a user for generating a signal for remotely placing said other modem in a said test mode;
   means for transmitting via said main channel a predetermined coded signal identifiable by said other modem causing said other modem to change from said test mode to a reconfiguration mode;
   means for generating a configuring signal for said other modem following identification of said coded signal by said other modem; and
   means for generating a signal for moving said other modem out of said reconfiguration mode.

6. A remotely configurable modem for use in a communications system that uses a main channel and has another modem, said modem comprising:
   means for receiving a signal over said main channel from said another modem placing said configurable modem in a test mode;
   means for identifying a predetermined coded signal sent from said another modem which causes said configurable modem to switch to a reconfiguration mode;
   means for receiving configuring signals over said main channel from said another modem moving said configurable modem out of said reconfiguration mode.

7. The modem according to claim 5 wherein said configuration signal generating means comprises means for generating a user selectable command code that corresponds to a modifiable function of said another modem.

8. The modem according to claim 6 wherein said configuration signals comprise at least one user selected command code that corresponds to a modifiable function in said configurable modem.

9. The method according to claim 1 wherein said using step includes said first modem transmitting a command to said second modem that causes said second modem to enter a remote digital loop (RDL) mode.

10. The method according to claim 2 further comprising the step of aborting the reconfiguration of said second modem if said first modem does not receive said acknowledgement within a predetermined window of time following the end of said transmitting step.

11. The modem according to claim 5 wherein said user selectable means comprises means for generating a remote digital loop (RDL) signal.

12. The modem according to claim 5 further comprising means for aborting said reconfiguration if said modem does not receive an acknowledgement signal within a predetermined window of time following the transmission of said coded signal.

13. The modem according to claim 6 wherein said test mode comprises a remote digital loop (RDL) mode.

14. The modem according to claim 6 further comprising means for aborting said reconfiguration if said configurable modem does not transmit over said main channel an acknowledgement signal within a predetermined window of time following the reception of said coded signal.

* * * * *